Jan. 19, 1943.  G. A. LYON  2,308,615
WHEEL COVER
Filed Nov. 28, 1939  2 Sheets-Sheet 2
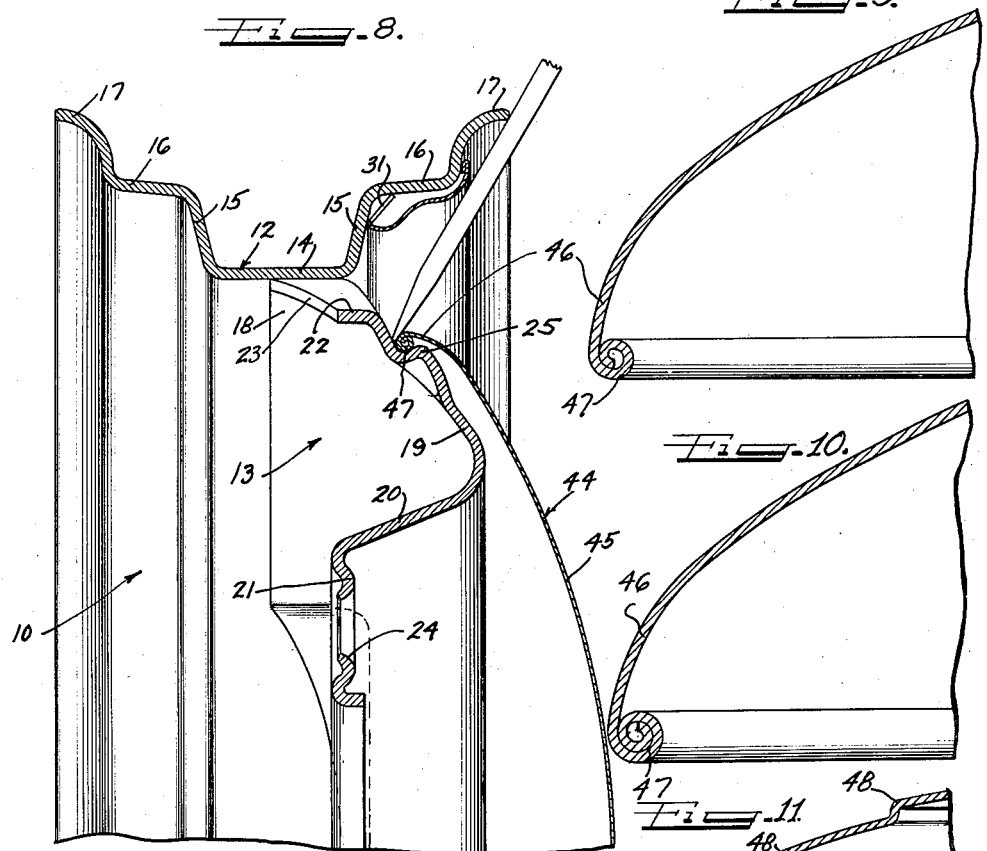
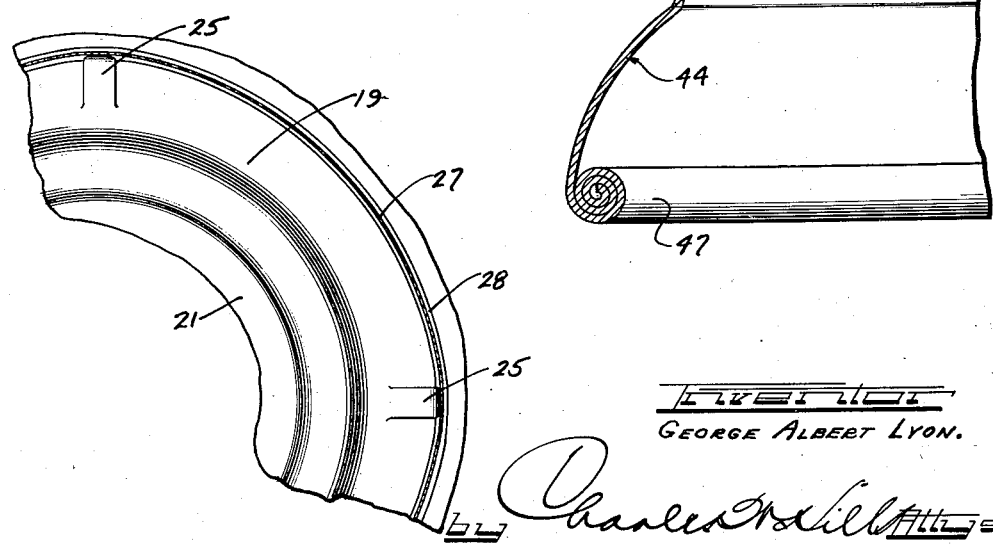
George Albert Lyon.

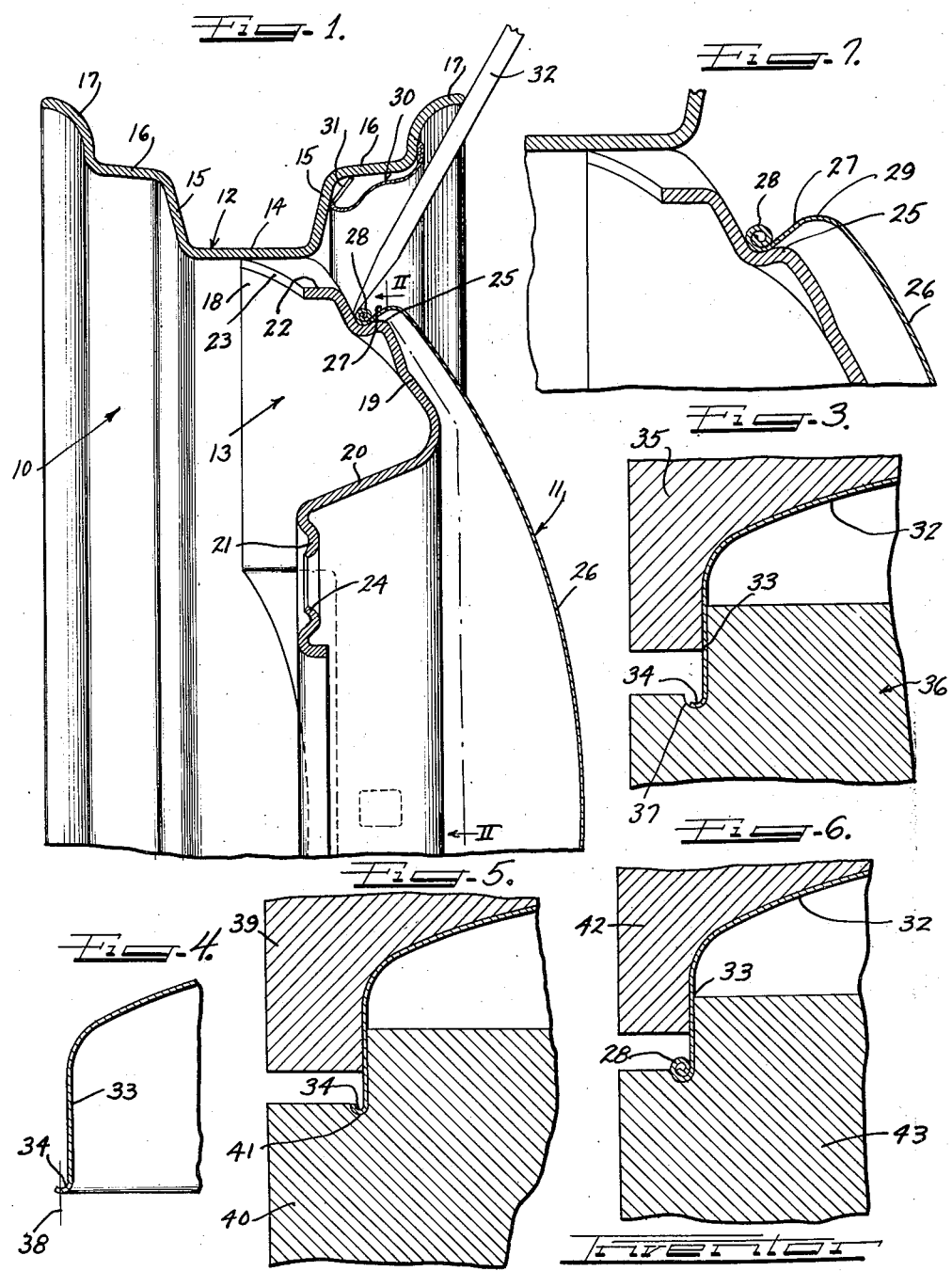

Patented Jan. 19, 1943

2,308,615

UNITED STATES PATENT OFFICE 2,308,615

WHEEL COVER

George Albert Lyon, Allenhurst, N. J.

Application November 28, 1939, Serial No. 306,527

4 Claims. (Cl. 301—37)

This invention relates to a wheel cover and more particularly to a wheel cover of the general type which is arranged to make a snap-on engagement with a vehicle wheel without the aid of any spring fingers or other separate attaching means.

The majority of vehicle wheels today are equipped with ornamental wheel disks or wheel covers over their outer surfaces. The use of these wheel covers permits a more economical manufacture of vehicle wheels, since the wheels themselves may be designed solely for strength and utility without regard to ornamental appearance, the wheel covers being employed for the latter purpose. The most popular form of wheel cover at the present time is one having a highly polished exterior surface. The exterior surface of the disk or cover may, of course, be finished in any other suitable manner, such as by enameling it or the like.

In order to minimize the total cost of the wheel assembly, it is of course necessary to minimize the cost of the wheel disk as well as that of the wheel as much as possible. The thinner the sheet metal stock is which is employed to make the wheel disk, the greater the saving in its manufacturing cost. It has been found that a wheel disk or cover may be constructed of sheet metal stock which is extremely thin but which is reinforced in a novel manner at the point where it is subjected to the greatest stresses and strains.

It is an object of the present invention to provide a novel wheel cover having a non-denting curled edge.

Another object of the present invention is to provide a novel wheel cover having greater rigidity with thinner metal and which has a proper and more desirable distribution of metal relative to the points on which it is attached to a vehicle wheel and also relative to the points on which the wheel cover is engaged by a pry-off tool.

A further object of the present invention is to provide a novel wheel disk or wheel cover member which is economical to manufacture and which is rugged and reliable in use.

Another and further object of the present invention is to provide a wheel cover member having a rolled edge of at least one and one-quarter turns.

Still another object is to provide a metal cover member either in the form of a disk or annulus having a curled continuous flexible edge provided with at least a double thickness of metal both at the pry-off point and at the place of retaining engagement with the wheel.

Another and still further object of the present invention is to provide a novel wheel cover member having an outwardly rolled curled edge, which curled edge is partially or wholly concealed by a bulged portion in the wheel cover member forwardly thereof.

The novel features which I believe to be characteristic of my invention are set forth with particularity in the appended claims. My invention itself, however, both as to its organization and manner of construction, together with further objects and advantages thereof, may best be understood by reference to the following description taken in connection with the accompanying drawings, in which:

Figure 1 is a vertical sectional view of the upper half of a wheel and wheel cover assembly;

Figure 2 is a fragmentary front view of a portion of the wheel and wheel cover assembly with a portion of the wheel cover broken away so as to view the assembly along the line II—II of Figure 1;

Figures 3 to 7 illustrate the novel method of making the wheel cover which is shown in Figure 1, Figure 7 being an enlarged fragmentary view of the wheel cover member as it is mounted on the vehicle wheel;

Figure 8 is a vertical sectional view of the upper portion of a wheel and wheel cover assembly, the wheel cover shown therein being a different embodiment of the present invention;

Figure 9 is an enlarged fragmentary sectional view of the wheel cover illustrated in the wheel assembly of Figure 8; and Figures 10 and 11 illustrate other forms of the general type of wheel cover which is illustrated in Figures 8 and 9.

Referring now to the preferred embodiment of my invention which is illustrated in Figures 1, 2 and 7 of the drawings, there is shown therein a wheel assembly comprising a vehicle wheel 10 and a wheel cover or wheel disk 11. As shown in the drawings, the wheel 10 comprises a rim part 12 and a body part 13. The rim 12 is of the usual drop center type and includes a base flange 14, opposite intermediate side flanges 15, opposite intermediate base flanges 16, and opposite edge portions 17. The drop center rim 12 as illustrated is of the type which is commonly employed in the automotive vehicle art of the present day, and, as is well known to those skilled in the art, is arranged to receive and accommodate a pneumatic tire (not shown).

The body part 13 of the wheel 10 includes, in general, a rearwardly extending outer flange 18, an outer web portion 19, a generally axially rearwardly and slightly radially inwardly extending inner web portion 20, and a radially inwardly extending wheel mounting flange 21. The rearwardly extending outer flange 18 is secured to the underside of the base flange 14 of the rim 12 in any suitable manner, such as by welding or riveting (not shown). Circumferentially spaced portions of the flange 18 are depressed radially inwardly as at 22 to permit circulation of air through the wheel. The rear edges 23 of the depressed portions 22 are turned back as is clearly shown in Figure 1 of the drawings.

The wheel mounting flange 21 is provided with an annular series of apertures 24 for the reception of the usual wheel mounting bolts (not shown), which bolts are arranged to extend therethrough into engagement with the hub portion or brake drum of the vehicle (not shown).

The outer web portion 19 is provided with a plurality of circumferentially spaced radially outwardly projecting protuberances 25. These protuberances 25 may be formed on the wheel 10 in any suitable manner and may be initially separate pieces of metal which are welded or otherwise secured to the wheel or they may be integral with the wheel as is shown in Figure 1 and formed by pressing up these portions of the web 19. As is indicated in Figures 1 and 2, four of these protuberances are employed in the embodiment of the invention illustrated and described herein.

The wheel cover or wheel disk 11 includes in general a central dome-shaped portion 26 and a generally rearwardly extending flange portion 27 which terminates in a rolled edge 28. The rearwardly extending flange 27 is bulged radially outwardly as at 29 to stiffen the disk at this point and to confine flexing of the flange 27 to the flange region. The rolled edge 28 is arranged to be sprung over the protuberances 25 on the wheel 10 thereby to secure the wheel cover 11 to the wheel.

As is shown in Figure 1, a trim ring 30 is also preferably mounted on the wheel 10. The trim ring 30 is an ornamental annular sheet metal member the radial inner edge of which is serrated and bent to provide a plurality of radially outwardly and axially outwardly obliquely projecting teeth 31 which make a biting engagement with the outer intermediate base flange 16 of the rim 12.

The wheel cover 11 is removed from the assembly by any suitable pry-off tool 32 such as a screw-driver or the like. The end of the screwdriver is inserted behind the roll 28 and the wheel cover 11 is then either pried off by a straight leverage action of the pry-off tool 32 bearing on the outer edge 17 of the rim 12 or by rotating or twisting the pry-off tool 32 to spring the rolled edge 28 out over the protuberances 25.

As is clearly shown in Figure 1, the relation of the rolled edge 28 with respect to the rest of the wheel assembly is such that the pry-off tool can engage the rolled edge 28 of the wheel cover 11 and bear against the outer edge 17 of the rim 12 without contacting the trim ring 30. This is extremely desirable since the trim ring is made of relatively thin sheet metal material and any prying force bearing against the spaced body portion of the trim ring would dent the same.

Turning now to an examination of the rolled edge 28 of the wheel cover 11 it will be noted that the extent of the roll is sufficient so as to provide a double thickness of metal opposite both the protuberances 25 and the point at which the pry-off tool 32 engages the roll. Where the rolled edge 28 is formed by an outward roll, as is shown in Figures 1 and 7, the extent of the roll is approximately one and one-quarter turns. That is to say, a roll of one and one-quarter turns is sufficient to provide a double thickness of metal opposite the pry-off tool as well as opposite the point on which the flange 27 is sprung over the protuberances 25 on the vehicle wheel 10. This provision of a double thickness of metal at these two points where the greatest stress occurs enables the use of relatively thin sheet metal stock in forming the wheel cover 11 with the resulting economy in manufacturing costs. It also provides a proper distribution of metal at the points where it is needed.

It will also be observed that the larger curl which is provided by a roll of the character described gives more clearance for the pry-off tool and thus facilitates the removal of the wheel cover 11 from the wheel 10. The rolled edge 28 of the wheel cover 11 also provides a non-denting edge portion.

In Figures 3 to 7 of the drawings I have illustrated a novel method by which the wheel cover 11 may be made which method is divisional subject matter but is illustrated herein because same affords a better understanding of my novel wheel cover and its structural formation. More specifically, the first step of the method is to curl the edge of a dome-shaped blank 32 having a rearwardly projecting flange portion 33 slightly more than one-quarter of one turn outwardly as at 34. This may be conveniently done in a die press which includes an upper movable die member 35 and a lower die block 36. The lower die block 36 has an annular channel portion 37 of semi-circular cross-section which effects the partial curling of the rear edge of the flange portion 33 when the upper die member 35 is moved downwardly with respect to the lower die block 36.

This operation sometimes causes an imperfect edge formation and for that reason it is preferable to trim off a slight portion of the curled edge as is indicated by the line 38 in Figure 4. We now have a blank in which the rearwardly projecting flange 33 has an outwardly curled edge 34, the extent of the curl being approximately one-quarter of a turn.

The third step of the process is to strike up the quarter curled edge 34 into a half-curl of smaller diameter. This operation is illustrated in Figure 5 and may be done in a die press including an upper die member 39 and a lower die member 40. The lower die member 40 is provided with an annular groove 41 of semi-circular cross-section.

The next step of the process is to roll or curl the half turned curled edge 34 into a one and one-quarter turned curled edge as is shown in Figure 6. Here again, the operation may be performed in a die press having an upper die member 42 and a lower die block 43. The one and one-quarter turned curled or rolled edge which is formed in the die press as indicated by Figure 6 is the curled edge 28 which has previously been referred to in connection with the description of the article itself in Figures 1, 2 and 7. The blank when removed from the die press as shown in Figure 6 then has its rearwardly projecting flange 33 bulged as at 29 in Figure 7, and the blank then becomes the finished wheel cover 11.

In Figure 8 of the drawings a modified form of the present invention is shown and for purposes of clarity those elements of the wheel assembly which correspond to similar elements in Figure 1 have been given the same reference numerals. The wheel 10 in Figure 8 is equipped with a wheel cover or wheel disk 44 which includes a dome-shaped central portion 45 and a rearwardly projecting flange portion 46 which terminates in an inwardly rolled edge 47. In Figure 9 of the drawings the character of the inward roll is clearly shown. The inward roll on the wheel cover 44 as shown in Figures 8 and 9 is one and one-quarter turns. One and one-quarter turns on an inward roll does not, however, provide a double thickness of metal opposite the protuberances 25 as well as opposite the pry-off tool 32 as it does with an outward roll. An inspection of Figures 8 and 9 will show that the double thickness is provided only opposite the pry-off tool by a one and one-quarter turn roll.

In order to provide a double thickness of metal opposite the protuberances 25 of the wheel 10 as well as opposite the pry-off tool 32 with an inward roll, it is necessary to provide a one and three-quarter turn roll as is shown in Figure 10.

When it is desired to use extremely thin metal in the wheel cover member more than one and three-quarter turn rolls may be employed as is illustrated in Figure 11. In other words, the rolled edge 47 may comprise a sufficient number of turns to effect the desired rigidity and stiffness at this point of the wheel cover. Where extremely thin metal is used, as is shown in Figure 11, it is generally desirable to stiffen the dome portion 45 of the wheel cover 44 by a plurality of stiffening ribs 48.

Inwardly rolled edge 47 of the wheel cover 44 which is described in Figures 8, 9, 10 and 11, may be formed by a process similar to that described in connection with the preferred form of the invention.

While I have shown particular embodiments of my invention, it will, of course, be understood that I do not wish to be limited thereto since many modifications may be made and I, therefore, contemplate by the appended claims to cover all such modifications which fall within the true spirit and scope of my invention.

I claim as my invention:

1. A circular member having a flange portion arranged to be sprung over attaching means on a second member, said flange portion having a rolled edge, the extent of the roll being sufficient to provide a double thickness of metal at the point where said flange portion is sprung on the said second member.

2. A circular member having a flange portion arranged to be sprung over rigid attaching means on a second member, said flange portion having a rolled edge, the extent of the roll being sufficient to provide a double thickness of metal opposite the rigid attaching means on said second member.

3. A wheel cover having a generally rearwardly projecting flange arranged to be sprung over rigid attaching means on a vehicle wheel, said rearwardly projecting flange having a rolled edge, the extent of the roll being sufficient to provide a double thickness of metal opposite the rigid attaching means on the vehicle wheel.

4. In a wheel structure, a wheel including rim and body parts, one of said parts having a plurality of spaced rigid protuberances arranged in a common circle and a circular cover member of thin metallic sheet and having a rearwardly extending continuous circular edge portion flexible into retaining cooperation with such protuberances, said edge portion being tightly curled into a rolled edge having a multiple thickness of metal at the point of engagement with said protuberances and also at an adjacent point accessible from the outside of said member for the application of a pry off tool thereto, said rolled edge comprising substantially more than one complete turn of metal to render said edge nondenting when engaged by a pry-off tool and also reinforcing said edge to enable it to have sufficient tension when flexed over said protuberances to exert a cover retaining pressure against said protuberances.

GEORGE ALBERT LYON.